Dec. 13, 1960  F. H. MUELLER  2,964,290
SERVICE CROSS

Filed July 22, 1957  2 Sheets-Sheet 1

INVENTOR
FRANK H. MUELLER

BY Cushman, Darby & Cushman
ATTORNEYS

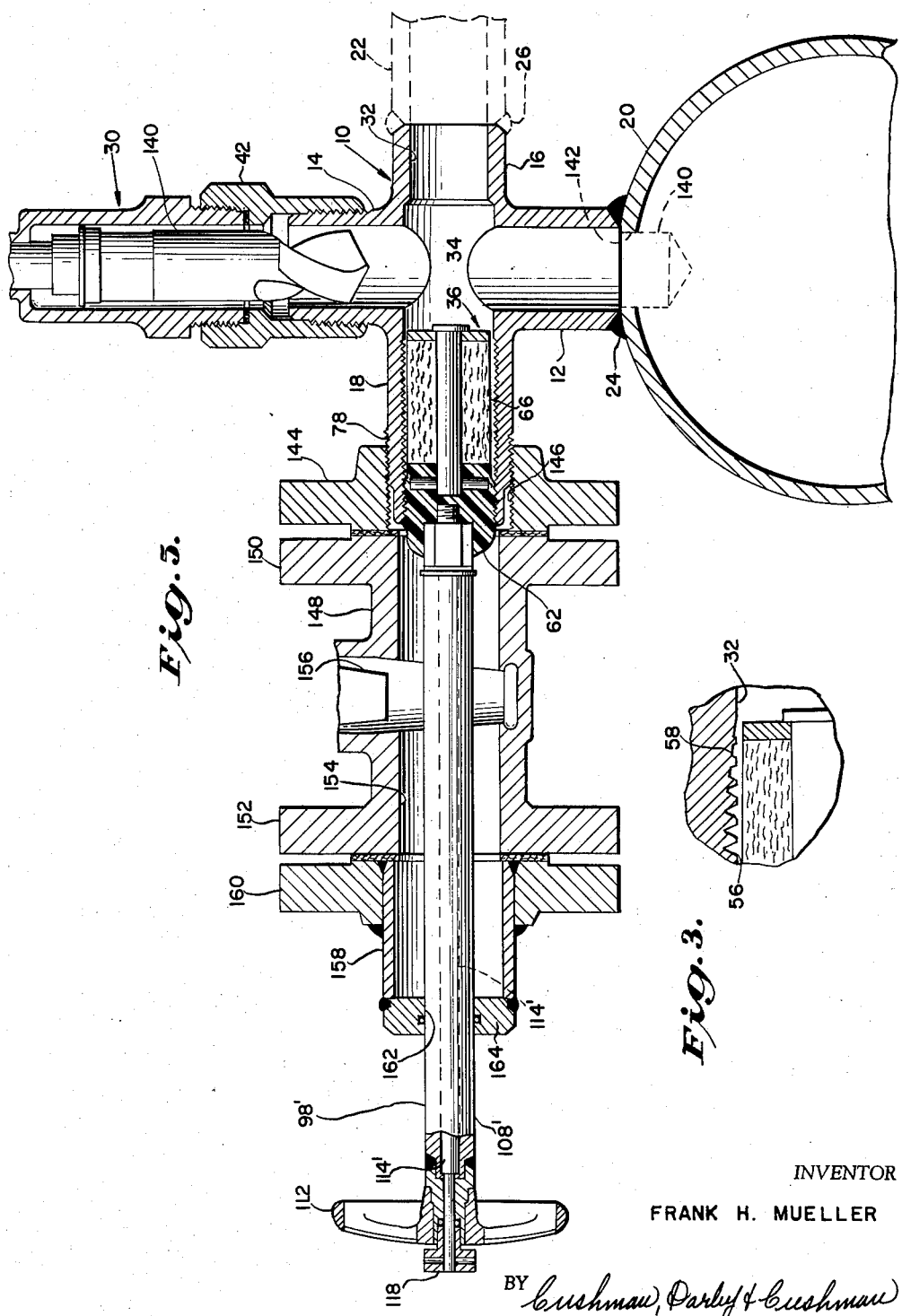

United States Patent Office 2,964,290
Patented Dec. 13, 1960

2,964,290

SERVICE CROSS

Frank H. Mueller, Decatur, Ill., assignor to Mueller Co., Decatur, Ill., a corporation of Illinois Filed July 22, 1957, Ser. No. 673,535

5 Claims. (Cl. 251—291)

The present invention relates to a fitting used to connect two conduits together and, more particularly, to a service connector fitting for connecting conduits such as mains to service pipes or lines, one of the conduits having fluid under pressure therein.

Throughout the specification and claims the conduits will be referred to as a "main" and "service pipe" for the purpose of description. However, it is to be understood that the service connector fitting of the present invention can be utilized in connecting any two pipes wherein one of the pipes has a fluid under pressure and it is desired to tap into that pipe. Therefore, the terms "main" and "service pipe" as used in the specification and claims is to be construed as any type of pipes or conduits wherein one of the pipes or conduits has a fluid under pressure and where it is desirable to connect the pipes or conduits without the leakage of fluid to atmosphere.

Heretofore, in the connection of mains to service pipes, T-shaped service connector fittings have been used, the T-shaped connector fittings having a through bore and a lateral bore. Such fittings were secured to the main with the inlet end of the throughbore in unrestricted fluid-tight relationship to the main and extending in a generally radial direction thereto, and the lateral bore or branch being connected to the end of service pipe. After the fitting had been secured to the two conduits, a valve structure such as a gate valve or a flop valve was detachably secured to the free end of the through-bore of the fitting and a main-drilling tool or machine was then secured to the valve for movement of the bit through the valve when opened and through the unrestricted bore of the fitting so as to drill or tap an outlet in the main. After the bit of the drilling machine was withdrawn from the through-bore of the fitting to a position past the valve, the valve was closed and the drilling machine was removed from the valve. It was then necessary to insert another tool on to the valve, this second tool being used to insert a stop or plug into the outer end of the through-bore. After the plug had been inserted to the outer end of the through-bore, the plug inserting tool was removed and generally the valve was then removed from the fitting. A sealing cap was then placed on the plugged end of the fitting and the completion operation was finished.

An object of the present invention is to provide a service connector fitting for connecting a service pipe to a main, the service connector fitting being so designed as to require a minimum amount of time and a minimum of accessory equipment for the completion operation of connecting the main to the service line.

Still another object of the present invention is to provide an improved service connector fitting wherein the complete operation of connecting a pipe to a main is accomplished without the escape of main fluid to atmosphere. This object is extremely important when the main fluid is flammable or toxic as it permits the operators to work in a condition where a hazard from the fluid is eliminated.

A further object of the present invention is the provision of an improved service connector fitting for connecting a main to a service pipe provided with an integral valve means which may be selectively operated during the completion operation of the connection, the service connector fitting being so designed that there is no danger of the tool used to operate the integral valve means from being blown off during the completion operation.

A still further object of the present invention is to provide an improved service connector fitting for connecting a service pipe to a main, the fitting being provided with valve means selectively operable therein during completion operation of connection, the valve means of the fitting being completely removable from the fitting when the fitting is welded to a service pipe or a main.

Still another object of the present invention is to provide an improved service connector fitting having valve means provided therein for use during completion operation, the fitting being so constructed that the valve means is prevented from being blown out of the fitting during the completion operation.

A further object of the present invention is to provide an improved service connector fitting of the type having valve means integrally carried therewith for selective use during the completion operation of connecting the service pipe to the main, the valve means being accessible after the completion operation for complete removal and replacement from the fitting.

A still further object of the present invention is to provide an improved type of valve means for use with a service connector fitting of the type having the valve means internally mounted therein.

Another object of the present invention is to provide a service connector fitting which may be economically manufactured and which is easy to install, service and operate, thereby reducing time for accomplishing the completion operation and subsequent maintenance on the connection.

These and other objects of the present invention will appear more fully in the following specification, claims and drawings in which:

Figure 3 is an enlarged fragmentary view of a portion of the expansible resilient stopper in the bore of one of the branches of the fitting, the interior threads of the bore which engage the exterior threads of the plug being shown in detail at their inner end;

Figure 1:
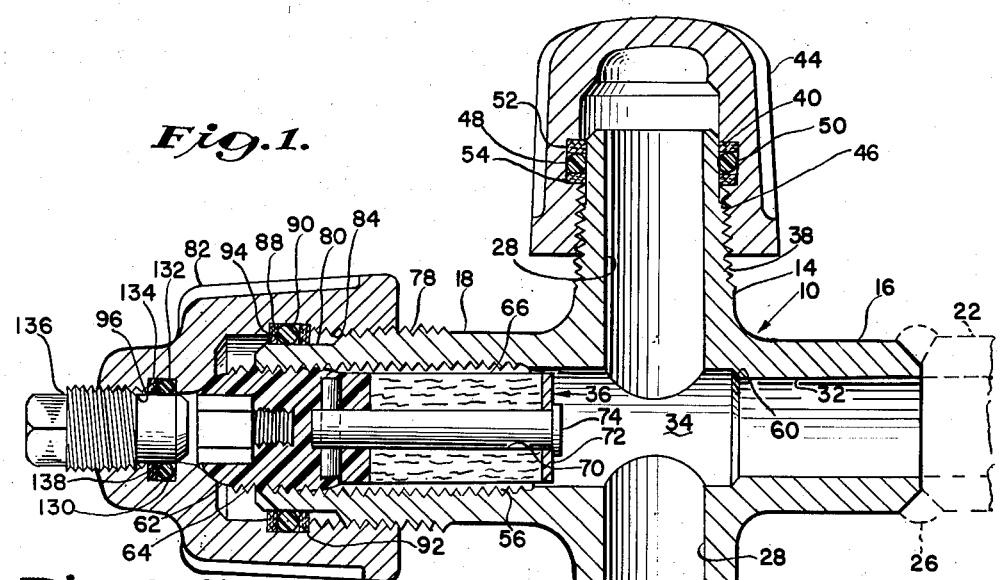
Figure 1 is a vertical sectional view of the service connector fitting of the present invention, the fitting being shown connected to a service line and a main.
Figure 4:
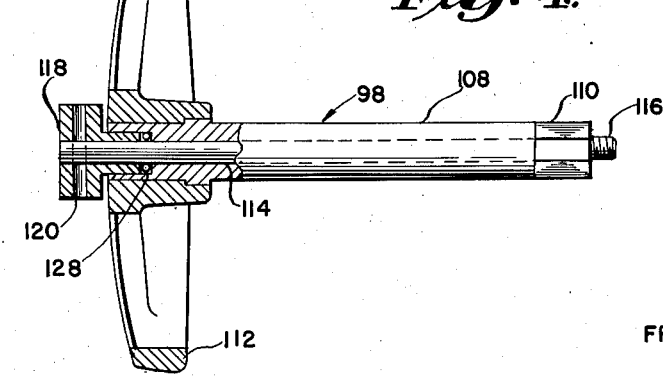

Figure 4 discloses a side elevational view, partly in section of the tool used to operate the valve means of the service connector fitting disclosed in Figure 1; and Figure 5 discloses a service connector fitting of the present invention modified for use when desirous of removing the valve means after the completion operation of connecting the service pipe to the main.

Referring now to the drawings wherein like characters or reference numerals represent like or similar parts, the service connector fitting of the present invention as illustrated in Figure 1 includes a cross-shaped body member generally designated by the numeral 10, the body member being defined by a first pair of diametrically opposed branches 12 and 14 respectively, and a second pair of diametrically opposed branches 16 and 18, respectively. The body member 10 is preferably made of steel and is adapted to be connected to a main shown in the dotted lines and indicated by the numeral 20 and a service pipe shown in dotted lines and indicated by the numeral 22. Usually, the branch 12 of the body member 10 is welded as indicated at 24 to the main, but it may be permanently secured to the main by service clamps (not shown) which are well known in the art or other suitable means. Branch 16 of body member 10 is generally welded to the service pipe 22 as indicated at 26 but it too may be connected by other means well known in the art such as threaded couplings or the like.

Branches 12 and 14 of body member 10 are provided with an unrestricted through-bore 28 through which a bit 140 of a main-drilling tool 30 may pass to bore or tap a hole or outlet in the main 20. The main-drilling tool 30 is of the type which will seal off outlet of the bore 28 so that there is no leak of fluid from the main to the atmosphere. Branches 16 and 18 of the cross-shaped body member 10 are provided with a bore 32 which intersects the bore 28 as indicated at 34. Valve means generally indicated by the numeral 36 is provided in the bore 32 for axial movement therein to block off the intersection 34 of the bores 28 and 32 as will be described in more detail later in the specification.

Branch 14 is provided with exterior threads 38 along a portion of its length. The threads 38 start inwardly of the end of the branch 14 and extend inwardly therefrom toward the center of the cross-shaped body so that the end portion 40 of the branch 14 is smooth and threadless. The threads 38 of the branch 14 are adapted to receive a service connector fitting adapter 42 which supports the main-drilling tool 30. After the completion operation of connecting the main 20 to the service pipe 32 is accomplished and the adapter 42 (shown in Figure 5) is removed, a cap member 44 provided with threads 46 is threaded on to the branch 14 so as to permanently seal the branch against the escape of main fluid. Cap member 46 is provided with a counter-bore 48 which is adapted to support an annular sealing ring 50 made of suitable resilient material. Leather back-up washers 52 and 54 are provided on each side of the sealing ring 50. The sealing ring cooperates with the smooth end portion 40 of branch 14 to provide a fluid-tight seal between the cap member 44 and the branch 14.

Bore 32 in branch 18 is internally threaded as indicated at 56 from the outer end of the branch inwardly toward but terminating short of the intersection 34 of bores 28 and 32. The interior threads 56 of branch 18 taper inwardly at their inner end as indicated at 58, and shown in detail in Figure 3, until they reach a point where they fade into the wall of the bore 32. Bore 32 extends from the ends 58 of the thread 56 across the intersection 34 with an unrestricted diameter and then its diameter is decreased in the branch 16 so that an abutment or shoulder 60 is provided in the branch 16.

Valve means 36 carried in the bore 32 of branch 18 includes a plug 62 exteriorly threaded at 64 and a cylindrical expansible resilient stopper 66. In more detail, the plug 62 which is molded from a substantially rigid inert resin or plastic material, such as nylon, Teflon, or the like, has its threads tapered inwardly at its inner end as indicated at 68 in Figure 2, the taper being complementary to the taper 58 of the interior threads 56 of bore 32. By providing a complementary taper 68 on threads 64 of the plug 62, the plug will have a fluid-tight seal with the branch 18 when it is threaded inwardly of the bore 32 as its taper threads 68 will wedge tightly with the tapered threads 58 of the interior threads 56. Stopper 66 is provided with an axial bore 70. An apertured rigid washer 72 of substantially the same diameter as the stopper 66 is provided on the inner end of the stopper and a bolt element 74 extending through the washer and the bore 70 is provided with a transverse pin 76. Plug 62, which as previously mentioned, is molded from a substantially rigid inert synthetic resin is molded around the end of the bolt 74 extending from the stopper 66 and around the pin 76 so as to provide an integral unit. As is now evident, when the plug 62 is threaded inwardly of the bore 32 as viewed at Figure 1, the washer element 36 will engage the abutment or shoulder 60 and will compress the cylindrical stopper 66 so that it expands radially to block the intersection 34 of the bores 28 and 32, thereby providing a fluid-tight seal of the bores at their point of intersection.

Branch 18 of cross-shaped body member 10 is provided with exterior threads 78 extending along a portion of its length. The threads 78 start inwardly of the end of branch 18 and terminate short of the intersection of the branch 18 with the branches 12 and 14. By starting the threads inwardly of the end of the branch 18, the end portion 80 of the branch is provided with a smooth threadless sealing surface, a cap member 82 having interior threads 84 adapted to be threaded on to the threads 78 of branch 18. A counterbore 88 provided in the interior wall of cap member 82 is adapted to support an annular sealing ring 90 made of a suitable resilient material, the sealing ring 90 being interposed between leather back-up washers 92 and 94. Sealing ring 90 contacts the end portion 80 of branch 18 and provides a fluid-tight seal between the cap member 82 and the branch so that no fluid can escape between the cooperating threads 78 and 84.

Cap member 82 is provided with an aperture 96 which is in axial alignment with the plug 62 and the bore 32. The diameter of the aperture 96 is less than the diameter of plug 62 so that when the cap member is threaded on to branch 18, the plug can never be blown out of the fitting causing injury to the operator. A tool generally indicated by the numeral 98 and disclosed in detail in Figure 4 may be inserted through the aperture 96 for engaging and rotating the plug 62 to thereby selectively advance or retract the stopper 66.

Figure 2:
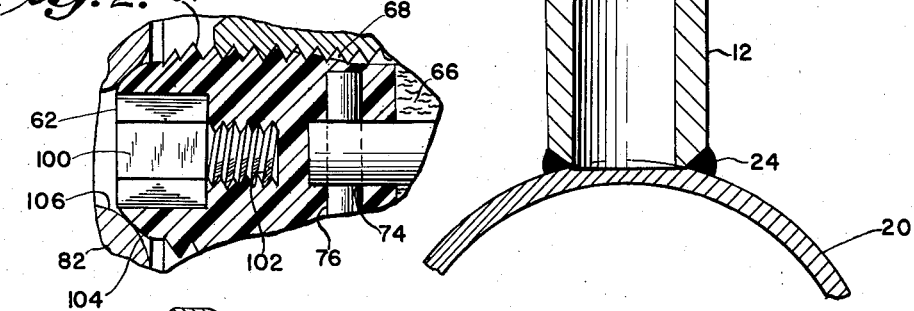
Figure 2 is an enlarged fragmentary view of the plug and cap member of the service connector fitting disclosed in Figure 1, the plug being shown in sealing engagement with the cap member.

Referring now to Figure 2, it will be noted that the plug 62 is provided with a hexagonal socket 100 and a concentrically aligned threaded bore 102 which is closed at its inner end. In addition, the outer end of the plug 62 is rounded as indicated at 104, the rounded end being adapted to seal against a sealing surface 106 of cap member 82 when the plug is moved to the position shown in Figure 1. When in this position, the plug will seal against the cap member so that there can be no escape of fluid through the aperture 96 in the cap member.

Referring now to Figure 4, the tool 98 for selectively advancing or retracting the plug 62 and stopper 66 includes a tubular sleeve member 108 which is substantially cylindrical along its major length, but which is provided with an end 110 and is hexagonal in cross-section and complementary to the hexagonal socket 100 of plug 62. The other end of tubular sleeve element 108 is provided with a handle 112 integrally secured thereto. A shaft element 114 carried within the tubular sleeve element 108 is rotatable with respect to the sleeve element. Shaft element 114 extends out of the hexagonal end 110 of sleeve element 108 and is threaded as indicated at 116, the threads 116 being complementary to the threads 102 in plug element 62. The other end of shaft element 114 extends out of the handle 112 and is provided with a T-shaped fitting 118 secured thereto by a transversely extending pin 120. A sealing ring 128 between the shaft element 114 and the tubular sleeve element 108 prevents leakage of fluid therebetween when the element is being used to operate the plug and stopper 62 and 66, respectively.

In operation, the tool 98 is inserted through the aperture 96 of the cap member 82. The hexagonal end 110 of sleeve element 108 fits into the hexagonal socket 100 of plug 62 and then the shaft element 114 is threaded into the threaded bore 102 so that there can be no relative axial movement between the plug 62 and the tool 98 when the tool is being operated. Rotation of the handle 112 will cause the plug 62 and stopper 66 to be moved inwardly or outwardly, and since the sleeve element 108 is not axially movable on the shaft 114 when the shaft is threaded into plug 62, the sleeve element 108 cannot blow off of the plug 62 should there be an escape of fluid past the plug-threads 64.

In order to insure a seal between the cap member 82 and the tool 98 when the tool is being used, the aperture 96 is provided with a counter-bore 130 which supports an annular sealing ring 132 and a leather back-up washer 134 which cooperate with cylindrical portion of sleeve element 108. A portion of the aperture 96 is threaded outwardly of the counter-bore 130, the threads being adapted to receive a threaded stopper or plug 136. The plug 136 is provided with a cylindrical shank portion 138 which cooperates with the sealing ring 132 to prevent any leakage of fluid past the threads of the plug and which acts as a seal for the aperture in addition to the seal between the surface 106 of the cap member 82 and the surface 104 of the plug 62.

The completion operation of connecting a main to a service pipe utilizing the service connector fitting of the present invention heretofore described may be accomplished as follows:

First, the cross-shaped body member 10, with the cap members 44 and 82 as well as the valve means 36, is welded to the main 20 and service pipe 22. When it is desired to weld the body member 10 to the main and service pipes, it is desirable to remove the cap members as well as the valve members so as to protect these parts from any excessive heat. Once the cross-shaped body member is connected to the main and service pipe by welding or other suitable connecting means, the valve means 36 is inserted into the cross-bore 32 by threading the plug 62 inwardly toward the intersection 34 of the cross-bore 32 and through bore 28. Cap member 82 is then threaded on to the branch 18 and the tool 98 is inserted into the aperture 96 of the cap member and connected to the plug 62. With the shaft element 114 threaded into the threaded bore 102 of the plug and the tubular sleeve element 108 fitted into the socket 100, the plug 62 is then backed away from the intersection 34 until it reaches a position shown in Figure 1 where it sealingly engages the cap member 82 as disclosed in Figure 2. A pressure-testing tool (not shown) of the usual type is then threaded on to the branch 14 and pressure is applied to the bores 32 and 28 to see if there are leaks at the junction of the body member 10 with the main and service pipes.

If no leaks develop after a desired pressure has been applied to the service connector fitting, then the testing tool is removed from the body member and replaced by the main-drilling tool 30 generally shown in Figure 5. The main-drilling tool 30 is of the type having a drilling bit 140 which may be advanced through the unrestricted bore 28 to a position where it engages the wall of main 20. After an outlet 142 has been drilled into the main 20, the bit 140 of the drilling tool 30 is withdrawn past the intersection 34 of the bores 28 and 32.

At this time, the drilling tool 30 is not removed from the branch 14 as it provides a seal for the outer end of bore 12. To block off flow of fluid from the main 20, the valve operating tool 98 is operated by rotating the handle 112 to advance the plug 62 and stopper 66 in the bore 32. When the rigid washer 72 on the stopper 66 engages the abutment 60, further rotation of the plug 62 will cause the stopper 66 to be compressed axially between the plug and the washer, compression of the stopper causing lateral expansion of the same so as to block passage through the through-bore 28 and cross-bore 32 at their point of intersection 34.

Once flow of fluid from the main 20 has been blocked off by movement of the stopper to the right of Figure 1, the drilling tool 30 and the adapter 42 may be removed and replaced by the cap member 44 which provides a fluid-tight seal for the open end of through-bore 28.

After the open end of through-bore 28 has been sealed off by the cap member 44, the plug 62 is backed off by the rotation of the tool 98 in an opposite direction until the stopper 66 is completely removed from the intersection 34 of bores 28 and 32 and plug 62 is in sealing engagement with the cap member 82 as indicated in Figure 2. Tool 98 may now be removed from the plug 62 by unthreading the shaft 114 from the threaded bore 102. The stop or plug 136 is then threaded into the aperture 96 of cap member 82, the plug providing an additional seal for the aperture. The completion operation is now accomplished and the service pipe 22 is connected to the main 20 for flow of fluid from one to the other.

It is evident that if, at some later time, it is desired to work on the service pipe 22, flow of fluid may be cut off by removing the plug 136 and inserting the tool 98 to operate the valve means 36 to block off through-bore 28.

Referring now to Figure 5, a modification of the present invention is disclosed whereby the valve means 36 within the bore 32 may be completely removed from the body member 10 after the completion operation of connecting the main 20 to the service pipe 22 is accomplished. In this form of the invention, the body member 10 and its valve means 36 is substantially identical with the service connector fitting just previously described, the only difference being that the cap 82 is removed and replaced by a flange fitting 144 having interior threads 146 which engage the exterior threads 78 of branch 18. A valve body 148 provided with their flanges 150 and 152 is bolted to the flange fitting 144. Valve body 148 is provided with a through-bore 154 which is in axial alignment with the bore 32. A gate valve 156 or the like is carried by the valve body 148 and is adapted to close or open the passage or bore 154. A cap member generally indicated by the numeral 158 is provided with a flange 160 which is adapted to be bolted to the flange 152 of valve body 148. Cap member 158 has an aperture 162 in its end through which an elongated valve operating tool 98' may be inserted to operate the valve means 36. An O-ring seal 164 or the like is carried by the cap member 158 in its aperture 162 for providing a seal between it and the tool 98'.

Tool 98' is essentially the same as the previously described tool 98 except that its sleeve element 108' and shaft element 114' are elongated so that it may reach through the valve body member 148 and engage the plug 62.

The operation of the modified form of the invention disclosed in Figure 5 may be briefly described as follows:

If it is desired the service connector fitting of the present invention may have the cap member 82 removed and replaced by the flange fitting 144, valve body 148 and cap 158 attached to the valve body. Then the tool 98' can be inserted through the apertured cap 158 and the valve means 36 may be operated as described above to perform a completion operation. The service connector fitting may be left after the completion operation with the flange 144, and valve body 154 connected thereto so that the valve means 36 may be removed and replaced at a later date as will be described below.

On the other hand, if at a subsequent time it is desired to remove and replace the plug 62 and stopper 66 of the fitting of Figure 1 after the completion operation, the cap member 82 may be removed and replaced by the flange fitting 144, the valve body 148 and cap member 158. The tool 98' is then inserted through the cap member 158 and secured to the plug 62, and the plug 62 together with the stopper 66 is then withdrawn past the valve 156. Gate-valve 156 is closed and the cap member 158 removed from the valve body so that the plug 62 and stopper 66 may be removed from tool 98' and replaced by a new plug and stopper.

It will be apparent from the above description of the present invention, that the completion operation of connecting a service pipe to a main and the servicing of this connection is materially simplified and requires less time and equipment to accomplish than previous completion operations. Further, it is now apparent that the service connector fitting of the present invention is of simple and inexpensive construction, yet provides in absolutely fluid-tight seal against the leakage of fluid from the main to atmosphere during tapping operation of the main or during subsequent maintenance work on the main or service pipe. While a particular manner of operation has been described for utilizing the present invention, it is, of course, within the scope of the present invention to perform operations other than those described. In this respect, it must be emphasized that while the service connector fitting has been described in connection with the completion operation of connecting a service pipe to a main, the invention could be utilized to connect any two fluid conduits, particularly when one of the conduits has fluid under pressure and it is desired to tap into the conduit with fluid under pressure.

The terminology used in the specification is for the purpose of description and not of limitation, the scope of the invention being defined in the claims.

I claim:

1. In a service connector fitting for connecting a main to a service pipe without the escape of main fluid: a body member having a through-bore of unrestricted diameter and diametrically opposed branches, each of said branches having a bore in communication with said through-bore, one of said branches having interior threads for at least a portion of its length; a plug in said branch having the interior threads, said plug having exterior threads engaging said interior threads; a stopper carried on the inner end of said plug for selective movement by the same from a position within the branch carrying said plug to a position blocking flow through said throughbore and the bore of the other of said branches; a cap member operatively connected to the branch carrying said plug, said cap member having an aperture therein in axial alignment with the axis of said plug; a tool having a stem removably insertable through the aperture in said cap member and detachably connected to said plug for selectively moving said plug and stopper; sealing means carried in the wall of the aperture of said cap member for sealing engagement with the stem of said tool; an annular seating surface in said cap member circumscribing the aperture and facing said plug; a seating surface on said plug complementary to the seating surface in said cap member, said seating surfaces of said plug and in said cap member engaging one another to provide a seal by axial movement of said plug and stopper to a position where said stopper is withdrawn from a blocking position in said through-bore thereby permitting said tool to be removed through the aperture in said cap.

2. In a service connector fitting for connecting a main to a service pipe without the escape of main fluid: a body member with a through-bore and a pair of diametrically opposed branches, each of said branches having a bore in communication with said through-bore; a plug mounted for movement in the bore of one of said branches; a stopper connected to said plug and selectively moved by the plug to block said through-bore and the bore in the other of said branches; a cap member on the end of the branch carrying said plug, and stopper, said cap member having an aperture therethrough; a tool for insertion through the aperture in said cap member, said tool including a tubular sleeve element having means thereon to rotate the same and a shaft element carried within and rotatable with respect to said tubular sleeve element, one of said elements of said tool being keyed to said plug to move the same longitudinally while the other of said elements of said tool is threaded to said plug so as to prevent relative axial movement between said tool and said plug; sealing means carried in the wall of the aperture of said cap member for sealing engagement with the tubular sleeve element of said tool; an annular seat in said cap member circumscribing the aperture and facing said plug; and an annular seat on said plug complementary to and facing the annular seat in said cap member, said annular seat on said plug and said annular seat on said cap member providing a seal between said plug and cap member when engaging one another whereby said tool may be removed from said plug and through the aperture in said cap member.

3. In a service connector fitting for connecting a main to a service pipe without the escape of main fluid to atmosphere: a body member with a through-bore and a pair of diametrically opposed branches, each of said branches having a bore in communication with said through-bore, one of said branches being internally threaded for at least a portion of its length; a plug carried in said one branch, said plug having exterior threads engaging said interior threads; a stopper carried on the inner end of said plug for selective movement by said plug from within the bore carrying said plug to a position blocking flow through said through-bore and the bore of the other of said branches, said plug having a bore of non-circular cross-section and a concentric threaded bore; a cap member operatively carried on the end of the branch carrying said plug and stopper, said cap member having an aperture therethrough; a tool for insertion through the aperture of said cap member to engage said plug and rotate the same, said tool including a tubular sleeve element having means on one end thereof to rotate the same and the other end thereof being non-circular in cross-section complementary to the non-circular bore in said plug, and a shaft element carried within said tubular sleeve element and rotatable with respect thereto, said shaft element having at least one threaded end extending out of said sleeve element for engaging the threads in said plug so as to prevent relative axial movement between said tool and said plug; sealing means carried in the wall of the aperture of said cap member for sealing engagement with the tubular sleeve element of said tool; an annular seat in said cap member circumscribing the aperture and facing said plug; and an annular seat on said plug complementary to and facing the annular seat in said cap member, said annular seat on said plug and said annular seat on said cap member providing a seal between said plug and cap member when engaging one another whereby said tool may be removed from said plug and through the aperture in said cap member.

4. A service connector fitting of the character described in claim 1 including sealing means between said cap member and the branch carrying said plug and stopper.

5. A combination of the character described in claim 3 including sealing means interposed between said tubular sleeve element and said shaft element.

References Cited in the file of this patent

UNITED STATES PATENTS

| | | |
|---|---|---|
| 22,189 | Mills | Nov. 30, 1858 |
| 147,060 | Malstrom | Feb. 3, 1874 |
| 202,785 | Brown | Apr. 23, 1878 |
| 485,717 | Smith | Nov. 8, 1892 |
| 796,111 | Canfield | Aug. 1, 1905 |
| 1,004,845 | Bohme | Oct. 3, 1911 |
| 1,099,592 | Dornin | June 9, 1914 |
| 1,759,798 | Murphy | May 20, 1930 |
| 2,763,282 | Reedy | Sept. 18, 1956 |

FOREIGN PATENTS

| | | |
|---|---|---|
| 5,526 | Great Britain | of 1913 |